May 11, 1954 E. J. LOMAZZO ET AL 2,678,100
GASKET CUTTER
Filed March 1, 1949 9 Sheets-Sheet 1

INVENTORS.
EDMUND J. LOMAZZO
LLOYD E. MAQUAT
BY
*John J. Hanrahan*
ATTORNEY

INVENTORS.
EDMUND J. LOMAZZO
BY LLOYD E. MAQUAT

ATTORNEY

INVENTORS.
EDMUND J. LOMAZZO
BY LLOYD E. MAQUAT
ATTORNEY

INVENTORS.
EDMUND J. LOMAZZO
BY LLOYD E. MAQUAT

John F. Hanrahan
ATTORNEY

INVENTORS.
Edmund J. Lomazzo
BY Lloyd E. Maquat
ATTORNEY

May 11, 1954

E. J. LOMAZZO ET AL 2,678,100

GASKET CUTTER

Filed March 1, 1949

INVENTORS.
EDMUND J. LOMAZZO
BY LLOYD E. MAQUAT

ATTORNEY

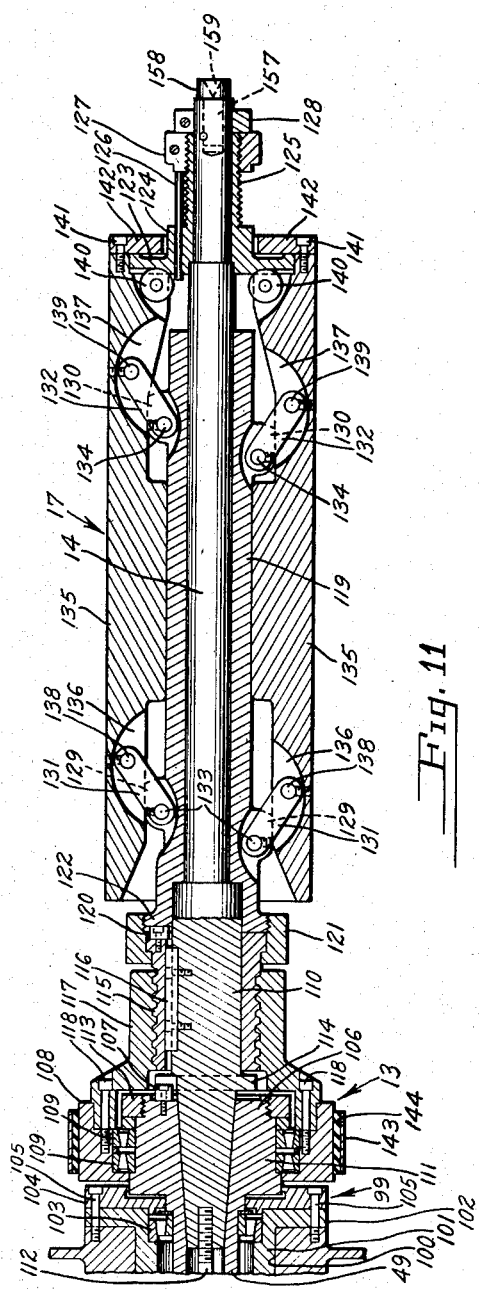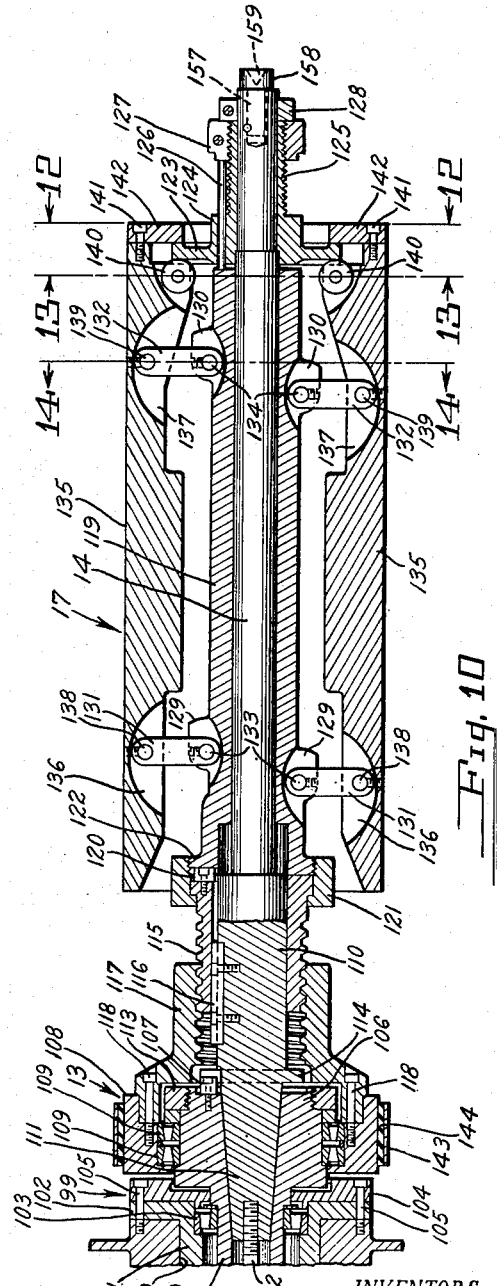
May 11, 1954    E. J. LOMAZZO ET AL    2,678,100
GASKET CUTTER
Filed March 1, 1949    9 Sheets-Sheet 8
INVENTORS.
Edmund J. Lomazzo
Lloyd E. Maquat
BY
ATTORNEY

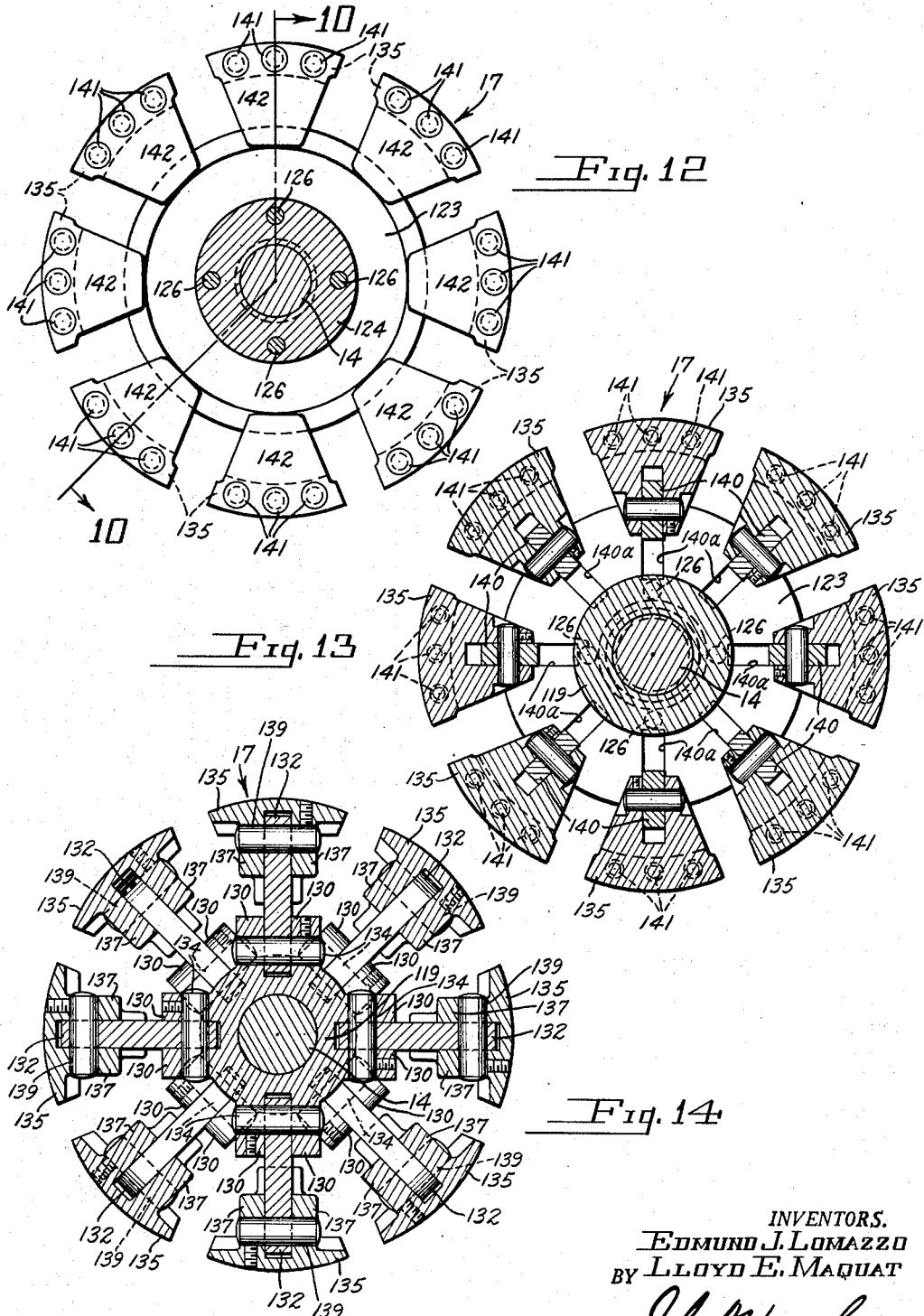

Patented May 11, 1954

2,678,100

UNITED STATES PATENT OFFICE 2,678,100

GASKET CUTTER

Edmund J. Lomazzo, Norwalk, and Lloyd E. Maquat, Easton, Conn., assignors, by mesne assignments, to Lico Manufacturing Co., Inc., Bridgeport, Conn., a corporation of Connecticut Application March 1, 1949, Serial No. 79,047

4 Claims. (Cl. 164—69)

This invention relates to new and useful improvements in machines and has particular relation to a gasket cutting machine.

An object of the invention is to provide a gasket cutter including an expansible mandrel, a head for expanding and contracting and rotating the mandrel, a tail stock for supporting the outer end of the mandrel and which tail stock is mounted for movement from a functioning position to a position laterally of the mandrel whereby work may be placed on and removed from the mandrel over the outer end of the latter without disturbing the mounting of the mandrel on the machine, and means for cutting a sleeve or cylinder of rubber or composition mounted on the mandrel into gaskets.

Another object is to provide in a gasket cutting machine having an expansible and collapsible mandrel, power means for expanding and collapsing the mandrel.

A further object is to provide an improved construction of expansible and collapsible mandrel for use in gasket cutting machines and the like.

A further object is to provide in an expansible and collapsible mandrel adapted to be power actuated to expanded and collapsed condition, adjustable stop means whereby following collapse of the mandrel for removal of work therefrom or the placing of work thereon, the mandrel may be easily and quickly expanded to the former diameter in one operation and without the necessity for measuring or the like.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 10 is a longitudinal sectional view through the mandrel, the view being on a larger scale and taken as along the line 10—10 of Fig. 12, the mandrel being expanded;

Fig. 11 is a similar view but with the mandrel collapsed;

Fig. 12 is an end elevational view looking from the outer end of the mandrel with the latter expanded, the view being taken as along the line 12—12 of Fig. 10 but on a slightly larger scale;

Fig. 13 is a transverse sectional view taken as along the line 13—13 of Fig. 10 but on the scale of Fig. 12; and Fig. 14 is a similar view taken as along the line 14—14 of Fig. 10 and on the scale of Fig. 13.

Figure 1:
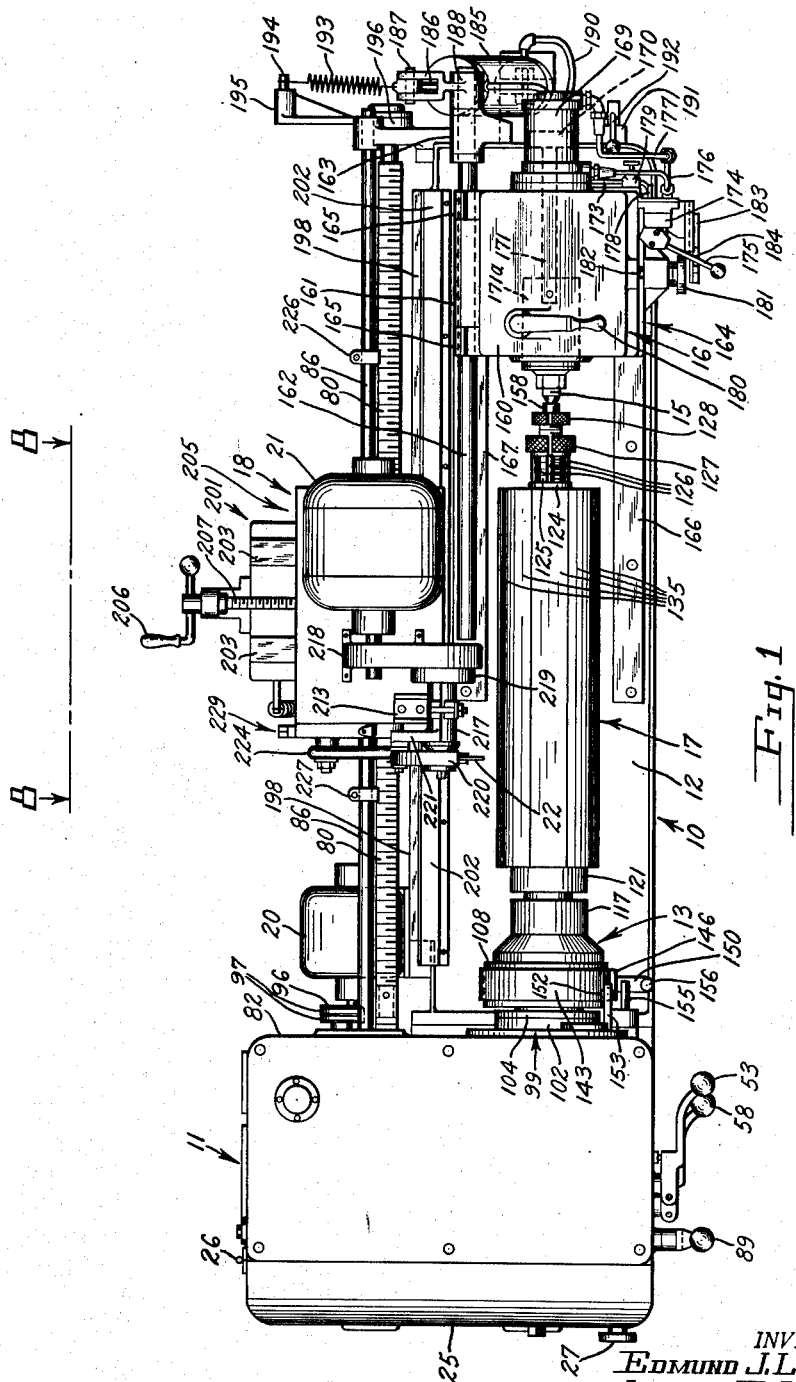
Fig. 1 is a top plan view of the machine of the invention.

Referring in detail to the drawings, at 10 is generally indicated the base or frame of the machine having at one end a motor and gear housing 11 and formed with or provided at its upper side with a bed 12. Through means within the housing 11 and later to be described, a head 13 at one side of the housing 11 and over the bed 12 is driven and this head supports the inner end of a mandrel mounting spindle 14 (see Figs. 10 and 11) and at the proper time rotates such spindle.

The outer end of the spindle, when the machine is in use, is supported and centered on a tail stock center 15 mounted by a tail stock 16 and at such times the spindle is supporting an expansible and collapsible mandrel, generally designated 17. This mandrel is adapted to receive and support a piece of work in the form of a relatively heavy cylinder generally of rubber or of a combination or a laminated structure of rubber and cotton or the like, as in the form of a layer or layers of canvas which has been impregnated and made into a laminated structure through the use of rubber and any desired fillers.

With the machine of the invention, this cylindrical sleeve or work is to be cut into a series of gaskets of equal thickness and the means for cutting the gaskets is automatically fed and operated as will appear and comprises the mechanism mounted at the rear of the machine and substantially in alignment with the spindle 14 and generally designated 18.

The machine is powered by three motors of which an electric motor 19 supplies the power for expanding and collapsing and driving or rotating the mandrel 17 as well as for intermittently feeding the cutter mechanism 18 outwardly longitudinally with respect to the base during the cutting of work into gaskets, while a second and somewhat smaller electric motor 20 provides for a quick return of the cutter mechanism 18 following the operation of cutting a sleeve into a plurality of gaskets, and an electric motor 21 provides the power for rotating a disc cutter 22 forming part of the mechanism 18. The various drives will be understood by reference to Figs. 1, 3, 4 and 5.

Built with the motor 19 is a casing 23 containing any adjustable or variable speed drive mechanism adjustable as on rotation of the hand wheel 24, access to which is obtained on opening of the door 25 of the housing 11. This door is shown as hinged along one vertical edge as at 26 and may be provided with a handle or hand knob 27. The motor and the casing 23 of the variable speed mechanism are shown as mounted on a platform 28 pivoted as at 29 and adapted for vertical adjustment by swinging movement about said pivot and to be locked in adjusted position through manipulation of the nuts 30 on a screw 31 passing through a portion of the platform. This adjustment is merely to keep driving belts 32 at the proper tension and for use when changing such belts and the latter are shown as passing over a dual pulley 33 on a drive shaft 34 from the casing 23 and also as passing over and serving to drive a dual pulley 35 fixed fast on a short shaft 36.

Also mounted within the housing 11 and parallel with the shaft 36 is a second shaft 37 above and parallel with which is an overdrive shaft 38. A gear 39 fast with the shaft 36 meshes with the larger gear 40 of a dual gear fast on the shaft 37 and in addition to the gear 40 including a gear 41 of slightly less diameter. This gear 41 meshes with a gear 42 turnable on a stub shaft 43 and meshing with a gear 44 turnable about the shaft 38 as a center. Also turnable about the shaft 38 is a large diameter gear 45 meshing with a small diameter gear 46 fast on the shaft 37 previously referred to.

Additionally, on the shaft 38 there is fixed a small diameter gear 47 meshing with a relatively large diameter gear 48 fixed or made rigid with a tubular shaft or sleeve 49 extending into the driving head 13 and through which motion is transmitted to said driving head. The gears 44 and 45 are adapted to be selectively coupled with the shaft 38 by means of a clutch 50 shiftable by a fork 51 fixed to the inner end portion of a bar 52 extending through the front wall of the housing 11 and at the outer side of such wall having fixed thereto a handle or manual 53 for rocking the shaft and thereby the fork 51 to shift the clutch 50.

In the drawings the clutch 50 and lever 53 are shown with the clutch in a neutral position and neither gear 44 nor gear 45 is coupled with the shaft 38. However, if the clutch is shifted toward the left in Figs. 4 and 5 by moving the manual 53 in a clockwise direction, the gear 44 driven by the gear 42 will be coupled with the shaft 38 and the latter will be driven and through gears 47 and 48 the cylindrical shaft 49 will be driven whereby (a brake being applied to the head 13 as will be explained) the mandrel 17 will be collapsed. On shifting of the clutch element 50 towards the right in Figs. 4 and 5 by movement of the manual 53 in a counterclockwise direction, the drive is then from the shaft 36 to the shaft 37 through the gears 39 and 40 and then through gear 46 to gear 45 which is now coupled to the shaft 38 and through that shaft and the gears 47 and 48 to the sleeve or spindle 49 whereby (a brake being applied to the head 13 as will be explained) the mandrel 17 is expanded.

Figure 5:
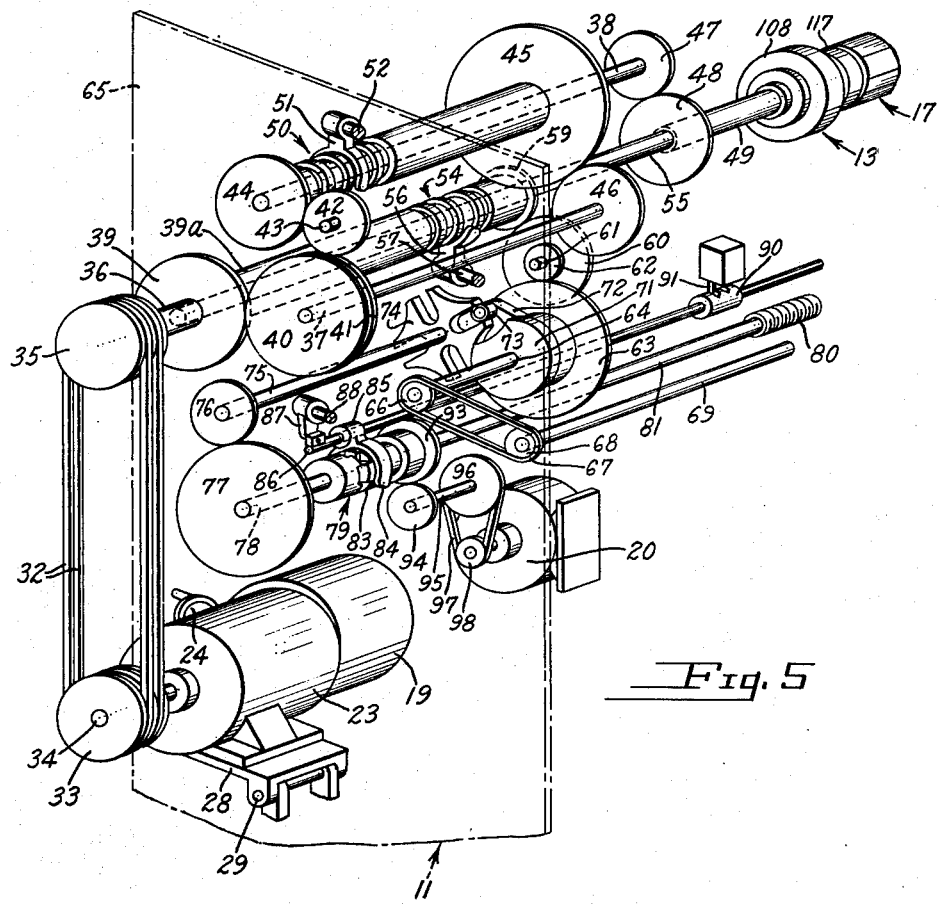
Fig. 5 is an isometric view showing the shafting and gearing of the various drives.

For rotating this mandrel during the operation of cutting gaskets, the drive is practically a straight line drive from the shaft 36 through a clutch 54 to a shaft 55 concentric with and in Fig. 5 shown as rotatable in a socket in shaft 36 and coupled directly with the cylindrical shaft or spindle 49, which latter may be an enlarged diameter portion of shaft 55. The clutch 54 is shiftable by means of a yoke 56 fast to the inner end portion of a bar 57, the outer end portion of which projects through the forward end of the housing 11 and has fixed thereto a handle or manual 58. When this manual is shifted to "start," clutch 54 is coupled directly coupling a sleeve-like hub 39a of the gear 39, and thus shaft 36, with the shaft 55 whereby the head 13 is rotated rotating the mandrel 17 for a cutting operation of the machine, as will later appear.

When this lever or manual 58 is shifted to the other position, i. e., "stop," shaft 55 is no longer coupled with shaft 36 and there is no direct drive to the head 13 except or unless clutch 50 is coupled. Fixed to the shaft 55 which is aligned with the shaft 36 and rotated with the shaft 55, is a gear 59 meshing with a gear 60 on a stub shaft 61. Such stub shaft also carries a relatively small gear 62 which meshes with a relatively large gear 63 the center of which is a stub shaft 64. On this same stub shaft 64, but outwardly of a wall 65 of the housing 11, is secured a pinion 66 which through a sprocket chain 67 drives a pinion 68 fast on a cam shaft 69.

Fixed to the relatively large diameter gear 63 as by means of screws 70 is a body 71 having an arm 72 carrying a roller 73 aligned with a Geneva gear 74 fast on a shaft 75 also projecting through the housing wall 65 and at the outer side thereof mounting a gear 76 meshing with a relatively large diameter gear 77 fixed on a shaft 78 which through a clutch means 79 may be connected to intermittently drive a feed screw 80, the inner portion 81 of which or the portion of which inwardly of a wall 82 of housing 11 is unthreaded. Of the clutch 79, the element 83 is the shiftable element. It is shiftable by means of a fork 84 fast with a hub 85 fixed to a shifter rod 86.

Figure 6:
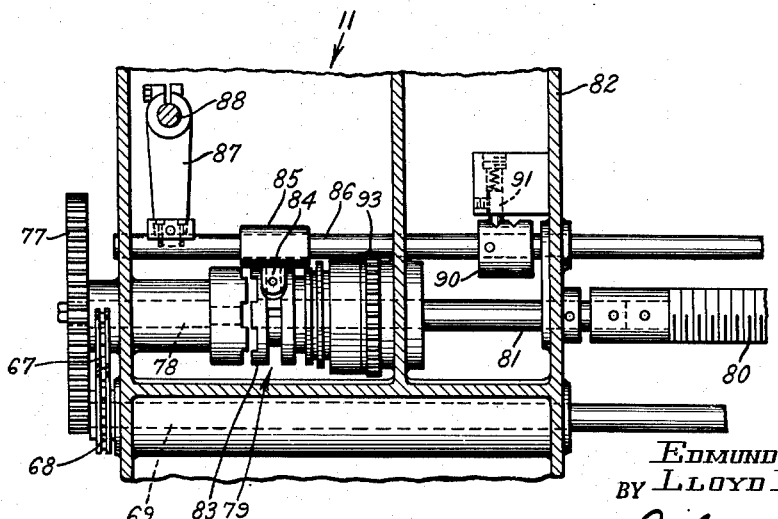
Fig. 6 is a detail view showing a clutching arrangement employed.

An arm or member 87 (see Fig. 6) is also fixed at its lower end to this shifter rod and the upper end portion of such arm is clamped about a short rod or bar 88 extending from the forward side of the housing 11 and having a hand lever or manual 89 fixed to it. Thus, it will be seen that the clutch 79 may be coupled and uncoupled, either through operation of the hand lever 89 or through a longitudinal movement of the shifter rod 86.

Figure 2:
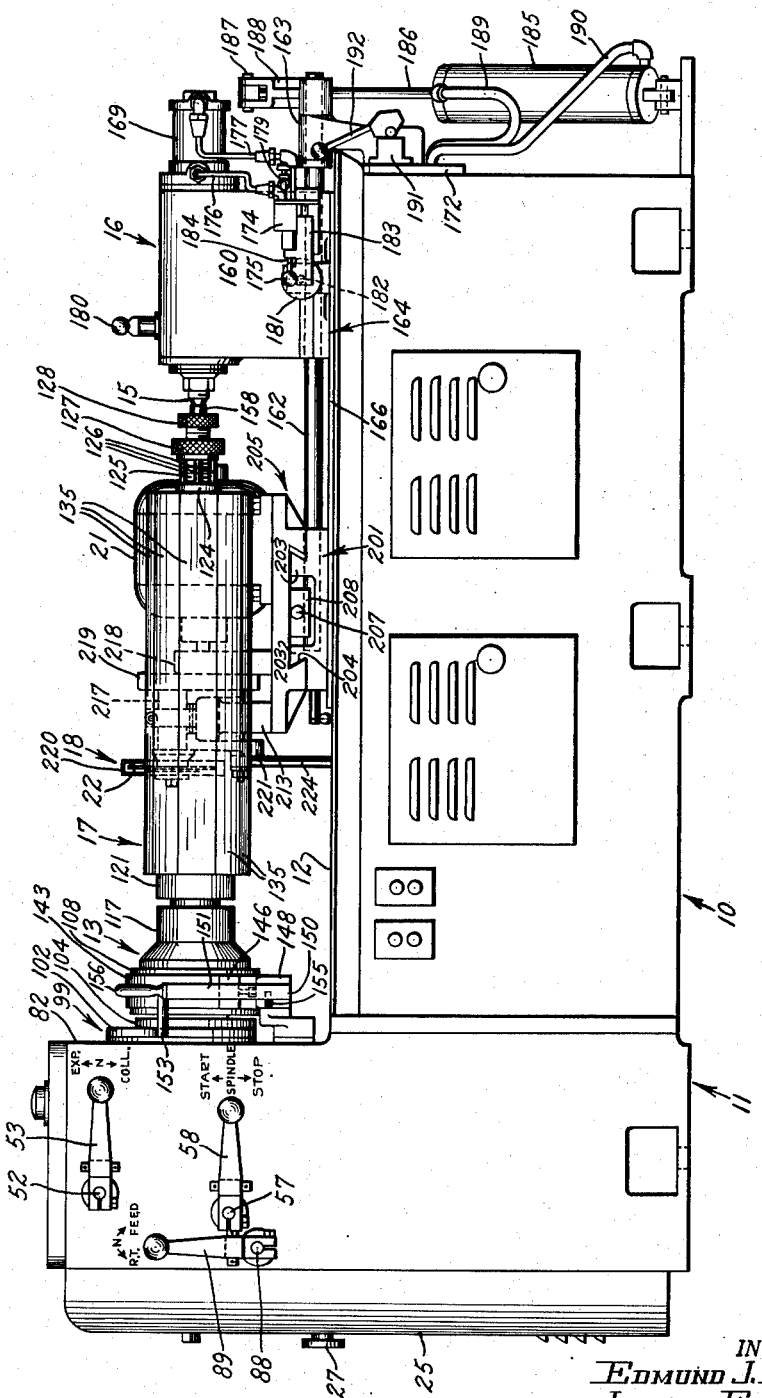
Fig. 2 is a front elevational view of said machine.
Figure 3:
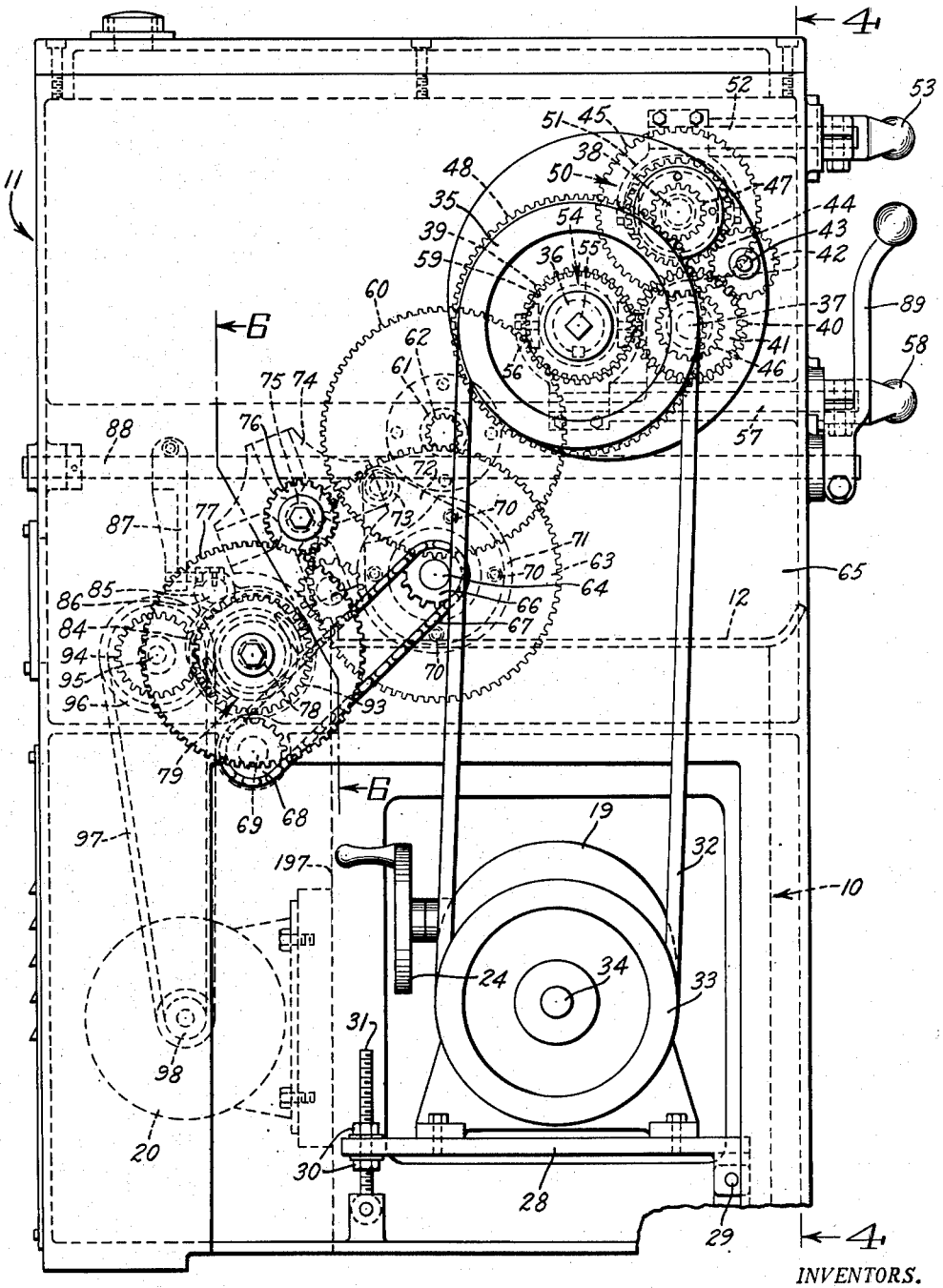
Fig. 3 is an end elevational view of the machine, the view being on a larger scale and taken from the left of the machine as viewed in Fig. 2.
Figure 4:
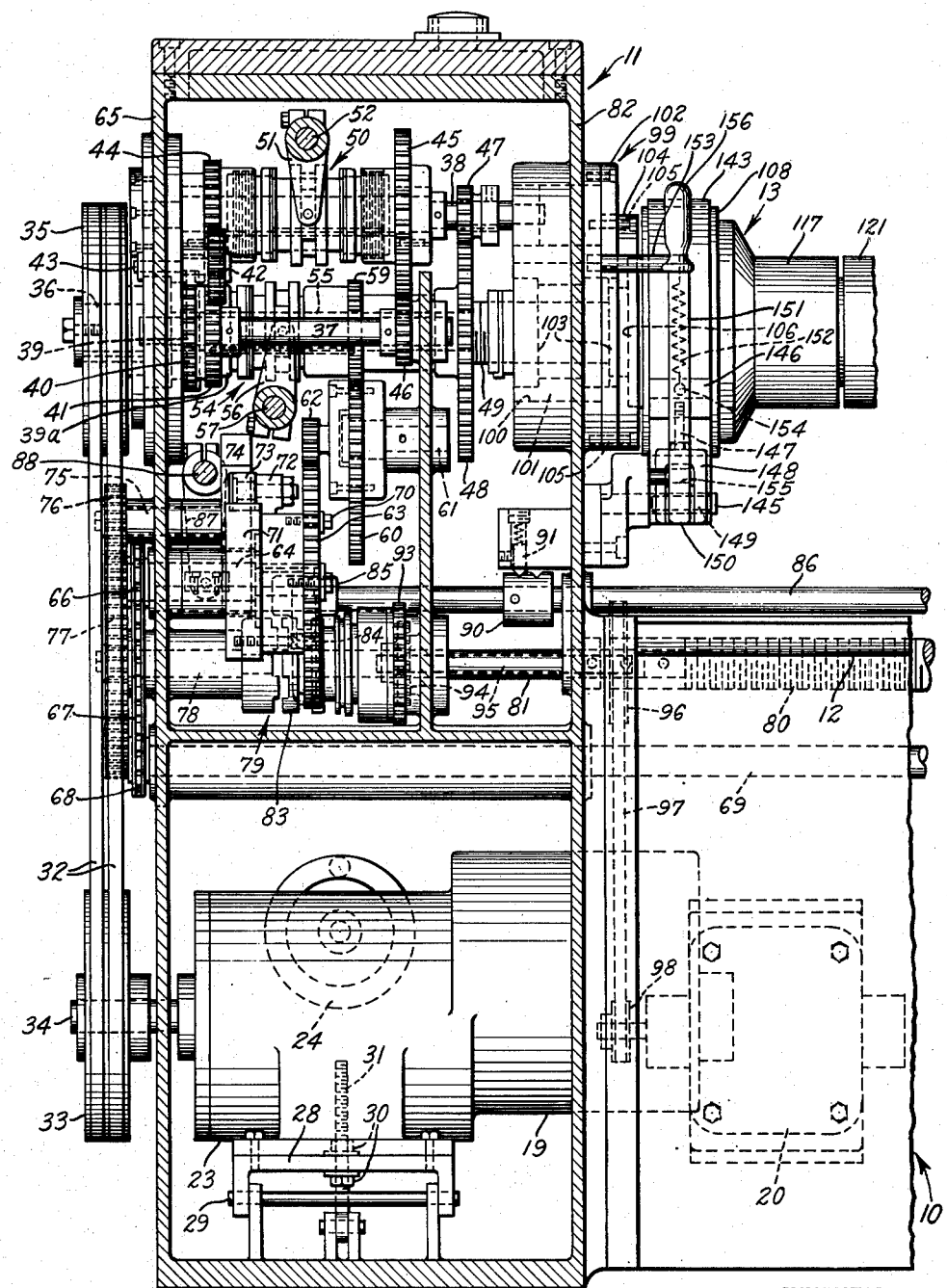
Fig. 4 is a view on the scale of Fig. 3 and taken as along the line 4—4 of Fig. 3, the door of the gear and motor housing being omitted.

The symbols on the front wall of the housing 11 in Fig. 2 indicate the two positions to which the shifter rod may be moved. When the shifter rod is in feed position the clutch 79 is so coupled that shaft 78 is intermittently driving shaft or feed screw 80. When the hand lever 89 is in the rapid traverse or "R. T." position, the clutch 79 is disconnected from shaft 78 whereby the latter is not driving the feed screw 80. However, in its rapid traverse position the clutch 79 couples the shaft 78 with a gear 93.

Fixed to the shifter rod 86 is a collar 90 having a pair of recesses in its upper edge and into one or the other of which enters a spring pressed plunger 91 for yieldingly or frictionally holding the rod in either its inner or outer position. In the inner position of rod 86 the clutch 79 is coupled with the gear 77 and in the outer position of the rod the clutch couples the shaft 81 with a gear 93. The rod 86 is adapted to be shifted automatically at the end of the cutting operation to disconnect the clutch element 83 from direct driving relation with the inner end portion of shaft 78 and to clutch gear 93 with screw portion 81. Now a gear 94 on a rapid traverse or return shaft 95 driving the gear 93 rotates the feed screw 80 continuously and rapidly and in a reverse direction for a purpose to be set forth. This shaft 95 also mounts a pulley 96 driven by belts 97 from a pulley 98 on the shaft of the rapid traverse or return motor 29 previously referred to.

Through the mechanism above described (see Fig. 6) it will be understood that the shifter rod 86 and the handle or lever 89 are mechanically connected and that either may be used to couple or uncouple the clutch 79 and that any movement imparted to the shifter rod 86 will result in movement of the hand lever 89 and vice versa.

A bearing member 99 mounted by the housing wall 82 supports the outer end of the shaft 38 and also the tubular shaft portion 49 of shaft 55 both previously referred to. Within an opening 100 through the means 99 (see Figs. 10 and 11) there is mounted a sleeve 101 having a laterally extending flange 102 at its outer end and this sleeve toward its outer end mounts bearings 103 for the hollow shaft or spindle 49. A plate 104 assists in maintaining these anti-friction bearings 103 in place and the plate and the sleeve member 101 are shown as secured to the means 99 by bolts 105.

Shown as integral with the outer end of the hollow spindle 49 is an inner head-like portion 106 at its forward end carrying lugs or keys 107. Mounted on this head-like portion, but adapted to be held against turning movement therewith, is a drum 108 mounted as on the anti-friction bearings 109. Toward its inner end the spindle 14 includes a substantially cylindrical portion 110 and inwardly of such portion a tapered or cone portion 111, the latter being received in a similarly shaped opening through the inner head 106.

A rod 112 may be connected with the inner end of the spindle and such rod will be provided with suitable means whereby the spindle will be drawn tight into the cone-shaped socket provided in the inner head 106. A nut 113 may be threaded to the head 106 to keep the bearings 109 in place and fixed to the spindle 14 at about the juncture of its portions 110 and 111 or, in fact, formed integral with the spindle at this point, is a collar 114 having sockets or openings therein, in number, equal to the number of the keys 107 fixed to the forward side of the inner head 106 and adapted to receive these keys. With this construction, it will be apparent that as the inner head 106 is rotated the spindle 14 must rotate with it being made fast to it for the purpose of rotation by means of the keys 107 entering openings or sockets in the collar 114.

An externally threaded sleeve 115 is disposed over the cylindrical portion 110 of the spindle 14 and is secured thereto for turning movement therewith, and for sliding movement in the direction of the length thereof, by an elongated key 116. Threaded onto this sleeve is a nut 117 having its inner end made fast to the drum 108 as by means of screws or bolts 118. The mandrel 17 is mounted on the spindle 14 and (see Figs. 10 and 11) it is here noted that this mandrel includes an inner sleeve 119 mounted on the spindle 14 to turn therewith and also for limited movement longitudinally thereof.

At its inner end this sleeve is provided with recesses or sockets to receive keys 120 on the outer end of the threaded sleeve 115 whereby such sleeve 115 is made fast to the sleeve 119 so that these sleeves must rotate together. Additionally, the outer end portion of the threaded sleeve 115 is coupled to the inner end portion of the sleeve 119 by means of a nut 121 flanged over the outer end portion of the threaded sleeve and shown as threaded over an enlarged diameter inner end portion or shoulder 122 of the sleeve 119. With the described construction it will be seen that on turning the nut 121 from the enlarged shoulder 122 of the sleeve 119 there is no connection between the mandrel 17 and any portion of the head 13 to prevent movement of the mandrel along the spindle 14 outwardly from the head. This matter will later be fully considered.

In addition to the sleeve 119, the mandrel 17 includes an annular plate or disc 123 having a hub portion 124 and integral with such hub portion there is an outwardly extending reduced diameter externally threaded sleeve 125. One or more elongated pins 126 pass through the hub portion 124 and may slide back and forth in this hub portion. Threaded on the sleeve 125 is a stop device in the form of a collar 127 and such collar is adapted to be adjusted along the sleeve and to limit the extent to which the pin or pins 126 may be pushed outwardly through the hub portion 124. A nut 128 is clamped on the outer end portion of the spindle 14 in a position against the outer end of the externally threaded sleeve 125 whereby such sleeve and, as will hereinafter more fully appear, the entire mandrel 17 is held against movement outwardly longitudinally of the spindle 14.

At suitably spaced points, the sleeve 119 is provided with inner and outer sets of lugs 129 and 130. The number of lugs employed will depend on the number of segments in the mandrel. The lugs of each set are arranged radially about the sleeve 119 and each lug of the inner set is, measured along the length of the sleeve, aligned with or in the same plane with its corresponding lug in the outer set. Measured transversely of the sleeve, the alternate lugs of the inner set and the alternate lugs of the outer set are slightly offset with respect to one another so that transversely the alternate lugs of the outer set of lugs are in slightly different planes and the same is true of the lugs of the inner set. The purpose of this will later be further considered but here it is noted that such an arrangement permits of our making an expansible and collapsible mandrel having an exceptionally large number of segments.

Sets of inner and outer links 131 and 132, all of the same length, are employed and each link 131 at its inner end is secured by means of a pin 133 with a pair of the lugs 129 while each link 132 at its inner end is secured as by a pin 134 with a pair of the lugs 130. These pins pivotally attach the inner ends of the links to the sleeve 119. A series of bars or segments 135 are provided, each having an arcuate outer surface, all bars or segments having their outer surface on an identical arc. Each bar or segment is also provided with inner and outer sets of lugs 136 and 137 and pins 138 secure the outer ends of the links 131 with the lugs 136 while similar pins 139 secure the outer ends of the links 132 with the lugs 137. With the described construction it will be seen that through the links 131 and 132 the bars or segments 135 are connected with the sleeve 119 but there may be relative movement between the segments or bars and the sleeve 119 as the links 131 and 132 swing on their pivots or on their pivotal connections with the sleeve and the segments or bars.

Toward its outer end each bar or segment 135 carries a roller 140 and these rollers are adapted to travel in radially extending guide slots 140a in the inner face of the disc 123. Similarly, screws 141 attach to the outer end of each bar or segment 135 a lug 142 and these lugs are radially arranged and each extends inwardly and overlaps the outer face or side of the disc 123. Since the rollers 140 bear against the inner surface of the slots 140a of the disc 123 and the lugs 142 bear against the outer face of said disc and these parts are rigid with the respective segments or bars 135, it will be understood that such segments or bars are secured against movements in the directions of their length by the disc 123 but may move radially outwardly and inwardly with respect to said disc. Thus, the mandrel 17 may be expanded from the collapsed condition of Fig. 11 to the expanded condition of Fig. 10 and from such expanded to such collapsed condition.

A brake band 143 having a suitable friction lining 144 has one end anchored as on a pivot or pin 145 (see Fig. 7) and is carried about the drum 108 and has its other end fixed in a head 146, which through an adjustable threaded rod 147 is connected with a link or fork 148 pivoted at 149 on an intermediate portion of the normally horizontal arm 150 of a hand lever 151. The inner end of the horizontal arm 150 of the lever 151 is pivoted for turning movement about the pivot 145. A coil spring 152 is anchored as at 153 to a wall of the housing 11 and at its other end at 154 to the head 146. Thus, it will be seen that this spring 152 is constantly drawing upwardly on said head and through the threaded bar 147 and fork 148 on the hand lever 151 whereby the brake band lining is held released from the drum 108.

A pin 155 acts as a stop for the horizontal arm of the lever 151 limiting the extent to which said lever may be shifted by the spring 152. With this arrangement it will be understood that on the hand grip 156 of the brake lever 151 being drawn outwardly to rock the lever in a counter-clockwise direction, the lining 144 of the brake is drawn against the drum 108 applying a frictional braking action.

Assuming the mandrel to be collapsed as in Fig. 11, a piece of work comprising a cylinder of rubber or of a laminated structure including rubber, canvas or the like, is slipped onto the mandrel over its outer end. Then the hand levers 58 and 89 being positioned whereby the clutches 79 and 54 are disengaged, the hand lever 53 is rocked upwardly to engage the clutch 50. Then the gear 39 on the shaft 36 driving the gear 40 and thus the gear 41 and the shaft 37 acts through the latter to drive gear 46 which drives the gear 45 and clutch 50 being coupled with such gear the latter drives the shaft 38 and consequently the small gear 47 which through the large gear 48 drives the hollow spindle 49 and thus the inner head 106 and the spindle 14. At this time the operator is grasping the brake handle 156 and applying the brake to the drum 108 is frictionally holding the latter against turning movement with the head 106 and spindle 14 and threaded sleeve 115.

Since the drum 108 is held against turning with these parts, the nut 117 secured to said drum by the bolts 118 is held against turning and the sleeve 115 being fixed to the spindle portion 110 by the key 116 is threaded outwardly with respect to the nut 117. As this occurs, said sleeve being connected with the sleeve 119 of the mandrel, the latter sleeve is shifted outwardly as from the position of Fig. 11 to or toward the position of Fig. 10. As the sleeve 119 is fed outwardly along the spindle 14, the sets of links 131 and 132 have a thrust applied to them which they transmit to the segments or bars 135.

Because of the engagement of the rollers 140 with the inner surface of the plate or disc 123, the segments or bars cannot move in the direction of their length and so the thrust applied to them through the links results in their moving outwardly radially with respect to the sleeve 119 or in a direction to increase the effective diameter of the mandrel. The diameter to which the mandrel is to be expanded is known and depends on the work in hand and accordingly the stop 127 has previously been adjusted on the threaded tubular portion 125. Therefore, as the sleeve 119 is fed by the threaded sleeve 115 screwing itself out of the nut 117, the forward end of the sleeve 119 strikes the inner ends of the pins 126 and these pins may move outwardly until they engage the stop 127. When this occurs, it is merely necessary that the operator release the brake handle whereupon the nut 117 and drum 108 will rotate with the other portions of the head and the mandrel and there will be no further attempt to expand the latter.

After work on the mandrel has been cut into segments it is then desirable to collapse the mandrel whereby to reduce its effective diameter and permit of the work being more readily removed from the mandrel. In this connection it will be understood that after a piece of work has been placed on the mandrel the latter is expanded to forcefully engage with the work and to expand the same slightly or at least to put a tension on the work. Generally there is a cushioning cylinder of rubber or the like about the mandrel and under the work whereby as the work is cut the knife is not brought against the metal mandrel.

To collapse the mandrel to permit of easier removal of the work the levers 58 and 89 are returned to or kept in neutral position disconnecting the clutches 79 and 54. Then the handle or lever 53 is shifted to engage clutch 50 for coupling gear 44 with the shaft 36. Now the drive is from the gear 39 on shaft 36 to the gear 40 and thus to the gear 41 on the shaft 37. Gear 41 is driving the intermediate or reversing gear 42 on the stub shaft 43 and such intermediate or reversing gear 42 meshes with and drives a gear 44 which, as above suggested, has now been clutched to the shaft 38. Thus, the shaft 38 is now driven in a reverse direction and through its gear 47 meshing with the large gear 48 on the hollow spindle 49, the latter and its inner head 106 are driven in the reverse direction to that previously described. Now the operator grasps the brake handle 156 and applies the brake to the drum 108 holding the nut 117 against revolving with the threaded sleeve 115. However, this sleeve continues to revolve or turn with the spindle 14 and the inner head 106 and thus the sleeve 115 is fed or threaded inwardly into the nut 117.

Through the coupling nut 121, sleeve 115 is connected with sleeve 119 of the mandrel and thus this latter sleeve will be drawn inwardly moving the inner ends of the sets of links 131 and 132 toward the left from the position shown in Fig. 10 and toward the positions in which the links are shown in Fig. 11. Such movement results in a pull being transmitted through the links to the segments or bars 135 but owing to the fact that the lugs 142 are rigid with the forward ends of these bars and such lugs overlap the outer end or side of the plate 123, the bars can have no longitudinal movement. Therefore, the mentioned pull or draw transmitted through the links 131 and 132 resolves itself into a movement drawing the segments or bars 135 inwardly toward the sleeve 119 reducing the effective diameter of the mandrel.

At this time, the work or product is removed from the mandrel and a new piece of work mounted on the mandrel and then the latter expanded by the drive first described above. In this connection it will be understood that so long as the work is of the same size the stop 127 is left in position and during the expanding of the mandrel the operator does not have to keep measuring the mandrel or the work to see if the proper expansion of the mandrel has been obtained.

When the sleeve 119 pushes the pins 126 hard against the stop 127 the mandrel is expanded to the desired extent and cannot be further expanded. At this time in order to hold the drum 108 and nut 117 stationary, a very considerable pull on the brake lever is required and the operator knows the proper expansion has been obtained even though he does not look to the position of the pins 126 at the outer end of the mandrel. He therefore merely releases the brake lever knowing that the desired expansion has been obtained.

At its outer end the spindle 14 is centered and supported on the center 15 of the tail stock 16. To prevent wear in the spindle 14 (see Figs. 10 and 11) the latter does not bear directly on the tail stock center 15 but is bored in its outer end to receive the stem 157 of a bearing head 158 having a tapered socket 159 at its outer end to receive the cone point of the tail stock center 15. Should the socket 159 wear, then the head 158 is replaced by withdrawing its stem from the outer end of the spindle 14 and then mounting a new head on the outer end of said spindle.

Tail stock 16 (see Figs. 1, 2 and 7) includes a housing 160 having an eye or tubular portion slidably received on but keyed to a longitudinally extending rod 162 turnable in a bracket 163 fastened to the outer end of the base 10. Arranged below the housing 160 is a cradle-like device 164 having ears 165 slidable on the rod 162 and located one at each end of the eye or tubular portion 161 of the housing 160. This cradle-like device, at its undersides, is supported or rests on a pair of bars or rails 166 and 167 fastened on the bed of the machine and extending longitudinally thereof in parallel relation with one another and with the bar 162.

Toward its forward edge, cradle 164 is provided with an inverted V-like rail 168 and in its forward under portion, the housing 160 has a corresponding groove to receive this rail when the housing is in normal position. With the described construction it will be understood that on rotation of the bar 162 in a clockwise direction the housing 160 will be rocked as from the full to the dotted line position of Fig. 7 while the cradle 164 will remain in place. Further, it will be clear that the entire tail stock comprising the housing 160 and cradle 164 may be shifted longitudinally of the base along the upper side of the bed, all such movement being in the direction of the length of the rod 162.

The tail stock center is projected and retracted by pneumatic or hydraulic means and to the desired end a cylinder 169 is mounted on the outer end of the housing 160 and has its piston 170 suitably connected as by a piston rod 171 with the tail stock center or a holder 171a for the latter. From a suitable source, compressed air is supplied to a distributing member 172 and through a flexible hose or tubing 173 from said member to a valve 174 mounted on the housing 160. This valve, on proper manipulation of a hand lever 175, controls the distribution of said compressed air through tubes 176 and 177 to the inner or outer ends of the cylinder 169 whereby to retract or project the tail stock center 15, and to connect either end of the cylinder with an exhaust port 178. A hand valve 179 is connected in the line 173 whereby the latter may be closed off from the valve 174.

180 is a hand lever of a suitable locking device for manually or mechanically locking the tail stock center 15 in projected position. A handle or knob 181 controls a bolt 182 for mechanically locking the forward portion of the housing 160 to the cradle 164. At 183 is shown a slide having a notch 184 into which extends the shank of the lever 175 whereby as this lever is drawn to a position to supply air to the outer end of the cylinder 169, this causes projection of the tail stock center 15 (the parts are shown in this position in Figs. 1 and 2). Said slide 183 is moved to a position over the knob 181 and thus the bolt 182 may not be casually released from locking position. The outer side of the handle or knob 181 is covered and the bolt 182 may not be thoughtlessly withdrawn from locking engagement with the housing 160.

On the valve lever 175 being thrown in the opposite direction to supply air to the inner end of the cylinder 169 and retract the tail stock center 15, the slide 183 is shifted in the opposite direction exposing knob 181 whereby the same may be used to withdraw the bolt 182 from locking engagement with the housing 160 to the end that the latter, as will hereinafter more fully appear, may be swung about the rod 162 as an axis to carry the housing 160 to a position laterally of the outer end of the mandrel 17.

When work is to be placed on this mandrel or when the product is to be removed from the mandrel it is planned that the work shall be placed on the mandrel over its outer end and the product removed from the mandrel over the same end. As the work is generally a rather long sleeve, it is planned to swing the entire tail stock housing 160 and the parts mounted thereon laterally with respect to the outer end of the mandrel as from the full to the dotted line position of Fig. 7.

As this housing and the associated parts are relatively heavy, power means are provided for swinging it to and from this lateral position. Such power means includes a cylinder and piston construction 185, the piston rod 186 of which is secured at its outer end by a pivot 187 with the outer end of an arm 188 keyed or otherwise made fast to its inner end with the shaft or rod 162. Air from the distributer 172 is to be selectively supplied to the inner and outer ends of the cylinder 185 as through tubing 189 and 190.

This distribution of air is controlled by a valve 191 shown as mounted on the chest 172 and having a manual or handle 192. On shifting of this valve to one position (assuming the parts to be in the full line position of Fig. 7) air may be supplied through the tube 189 to the inner end of the cylinder 185 forcing the piston downwardly in the cylinder and retracting the piston rod 186 thereby rocking the arm 188 in a clockwise direction.

Figure 7:
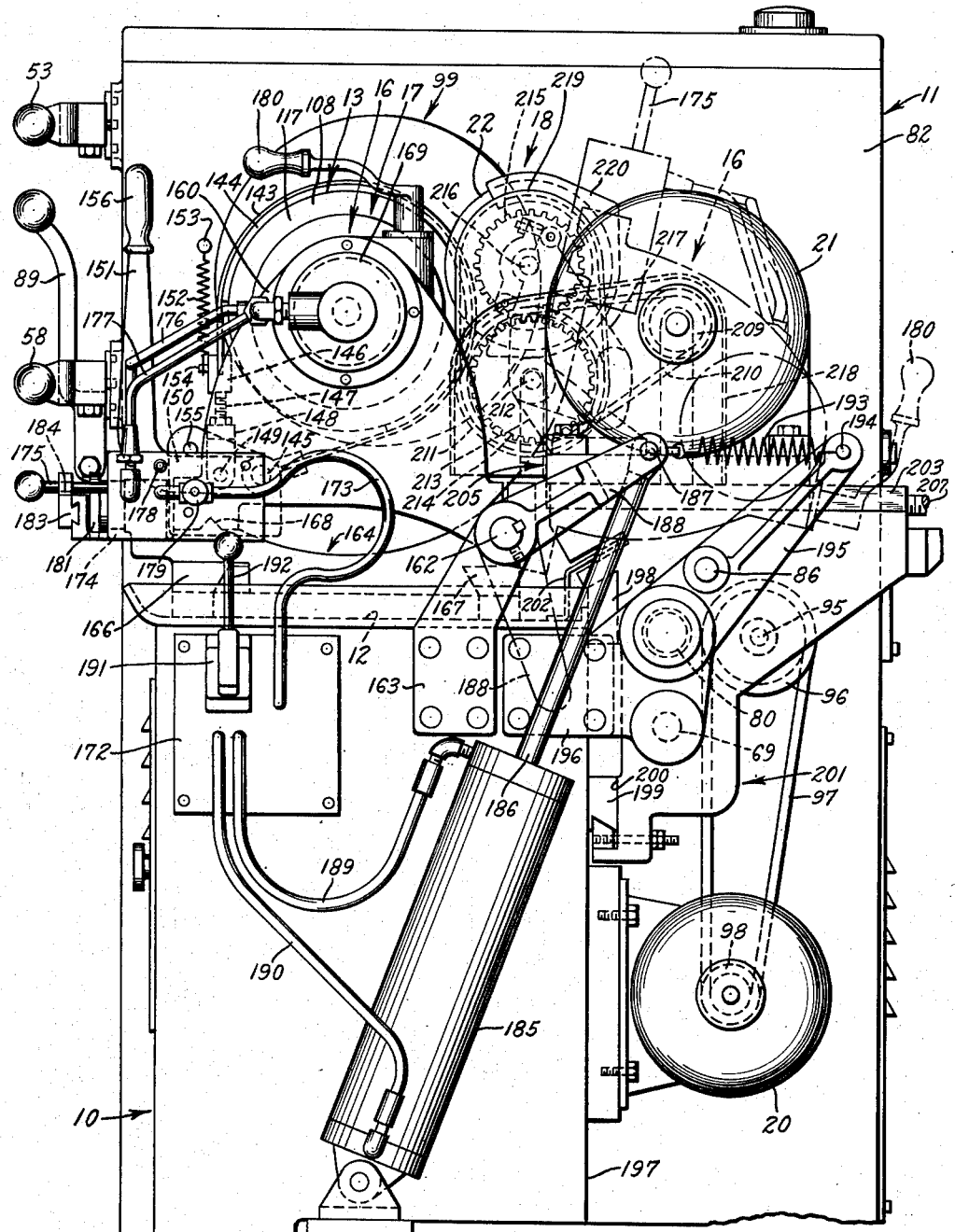
Fig. 7 is an end elevational view on the scale of Fig. 3 but taken from the right hand end of Fig. 2.

Since this arm is fastened to the rod 162 and the tail stock housing 160 is likewise fastened to such rod, the tail stock housing 160 will be rocked from the full to the dotted line position of Fig. 7. Now, the mandrel having been collapsed, the product is removed from the mandrel and a new piece of work applied over its outer end. Then the valve 191 is operated to its opposite position and air exhausted from the upper end of the cylinder 185 and supplied to the lower end thereof through the tube 190 again forcing the piston rod 186 outwardly of the cylinder to the full position of Fig. 7. This will rock the arm 188 and consequently the rod 162 and the tail stock housing back to what may be considered the normal positions of these parts with the tail stock housing aligning the tail stock center 15 with the outer end of the mandrel spindle 14.

It is not necessary to maintain pressure in the cylinder 185 to retain the parts in this position since, obviously, the weight of the housing 160 and parts mounted thereon tends to keep it in this position and it is locked by the bolt 182. A counterbalancing spring 193 may be provided for assisting in the movements of the housing 160. This spring is shown as anchored to the pin 187 and to a pin 194 on the outer end of an arm 195 of a bracket 196 secured to the end of the machine base 10.

Figures 8, 9:
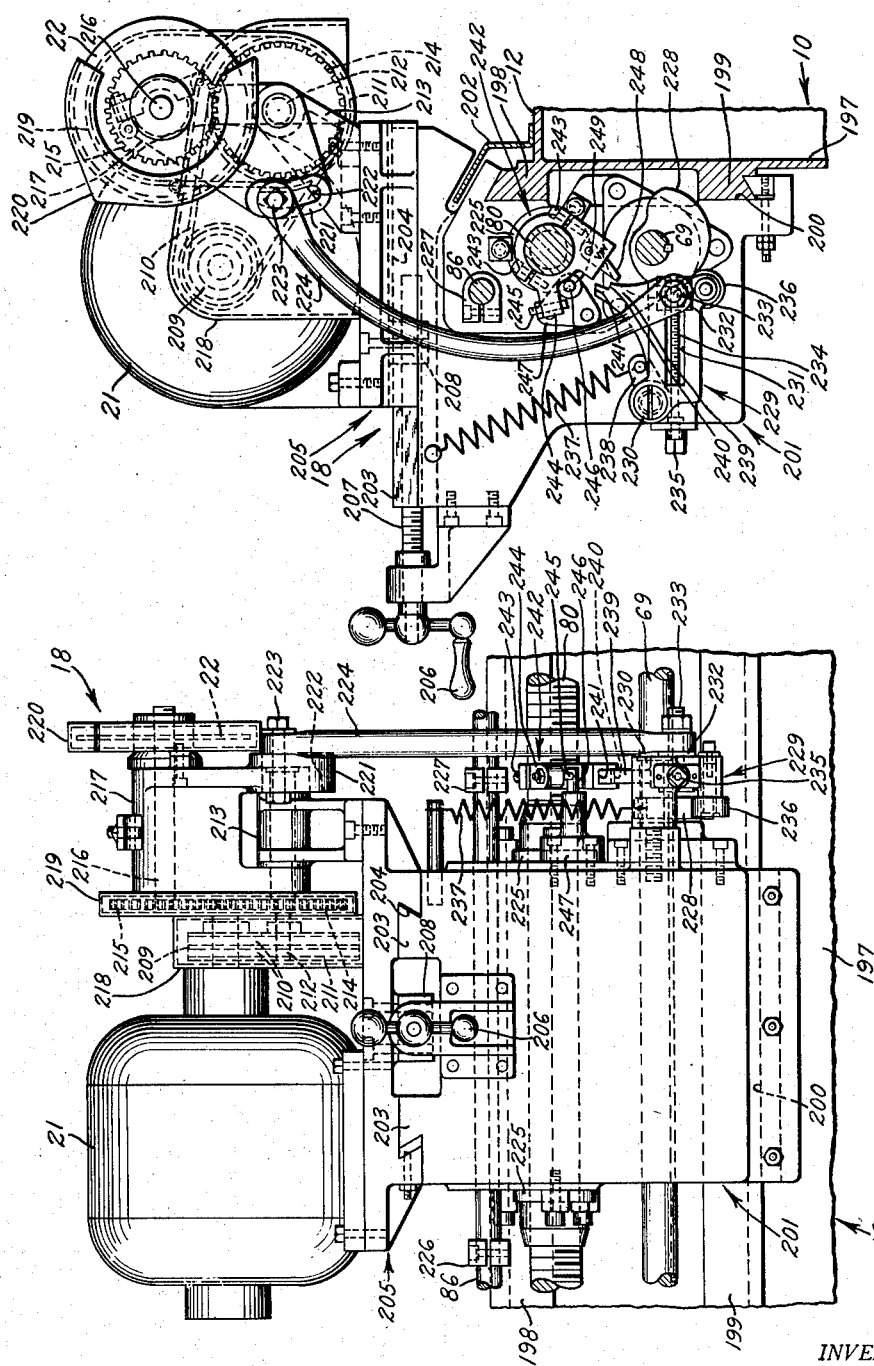
Fig. 8 is a rear elevational view of the cutter mechanism, the view being taken as suggested by the line 8—8 in Fig. 1.
Fig. 9 is a view partly in section and partly in elevation, the view being taken as looking into the right hand end of Fig. 8.

The rear wall 197 of the base 10 (see Figs. 8 and 9) is provided with a pair of upper and lower horizontal rails 198 and 199 received in the undercut or dovetail ways 200 in the forward side of a saddle, generally designated 201, whereby the saddle is mounted on the base 10 for movement longitudinally thereof, the saddle being supported by and slidable on said rails 198 and 199. A sheet metal dust or chip guard 202 is shown as mounted on the base and extending into the saddle over the upper rail 198.

On its upper side, saddle 201 is provided with a pair of rails 203 received in a way 204 in the underside of a slide 205. These rails and the way extend transversely with respect to the base 10 and the slide 205 is adjustable inwardly and outwardly on the rails on manipulation of a handle 206 fixed to a screw 207 threaded through a nut 208 rigid with the slide 205. Thus, on manipulation of the handle 206, the slide and a means mounted thereon are adjustable toward and from the mandrel 17.

The motor 21 is secured against the upper side of the slide 205 and this motor, through a pulley 209 and belts 210, drives a dual pulley 211 fast on a shaft 212 mounted in the arms of bracket 213 attached to the upper side of the bed 205. A gear 214 on the shaft 212 meshes with and drives a gear 215 fast to one end portion of a shaft 216 and on the other end portion of which is mounted the disc cutter 22. Shaft 216 is journalled in a bracket 217 mounted on the shaft 212 for turning movement about the same. It will be understood that on any such turning movement, the gear 215 will simply be rolled about the gear 214 and that such gears will remain in mesh whereby the disc cutter 22 may be rotated from the motor 21 in any position to which the bracket 217 may be rocked on the shaft 212.

Housings 218 and 219 are shown enclosing the belts 210 and the pulleys driving such belt as well as the pulleys driven by the belt. Also these housings enclose the gears 214 and 215. The housing 219 is rockable with the bracket 217. A guard 220 partly encloses the cutter disc 22 but does not entirely encircle the disc, leaving the inner portion of the latter exposed for cutting operations. An extension 221 of the bracket 217 is provided with an arcuate slot 222 through which passes a bolt 223 securing the upper end of a curved rod 224 to the bracket. Obviously, the slot 222 and the bolt 223 provide an adjustable connection for securing the upper end of the rod 224 to the bracket 217.

The carrier or saddle 201 is provided as shown on its opposite ends with nuts 225 fast to the saddle or held against turning movement relative thereto and the feed screw 80 is threaded through these nuts whereby on turning of the screw in one direction or the other, the entire cutter mechanism including the saddle 201 will be fed longitudinally of the bed 10 either outwardly or inwardly, depending on the direction in which the screw is turned. The shifter rod 86 also passes through the carriage or saddle 201 but there is a clearance between these parts to permit of the saddle moving without imparting movement to the shifter rod. However, a pair of adjustable stops 226 and 227 are mounted on the shifter rod at the outer and inner sides of the saddle 201 to be engaged by the latter at the end of a movement in either direction bringing about shifting of the clutch 79 and discontinuance of a feed of the saddle, all as will later fully appear.

In addition, the cam shaft 69 passes through the saddle 201 and keyed to this shaft for turning movement therewith but adapted to be slid along the shaft with the saddle 201 is a cam 228. Slidable on the cam shaft 69 with the cam is a bracket device 229 pivotally mounted on the side of the saddle 201 as on a pivot 230. Bracket device 229 has a slot 231 therein in which is mounted a cross head 232 attached to the lower end of the rod 224 by means of a bolt or the like 233.

Threaded into the cross head 232 is a screw 234 which on turning is adapted to feed the cross head longitudinally in the slot 231 to change the relationship between the lower end of the rod 224 and the pivot 230. Screw 234 is adapted to be turned by the application of a wrench or other tool to its squared outer end 235. Further, fixed to the bracket 229 at a side thereof opposite that against which the lower end of rod 224 is attached, is a roller 236 positioned in alignment with the cam 228 and adapted to be engaged by said cam as the latter is rotated whereby the bracket 229 will be rocked in a counterclockwise direction about the pivot 230.

A relatively heavy coil spring 237 is anchored at its upper end to the saddle 201 and at its lower end to the outer end of an arm 238 fixed to the bracket 229 whereby on movement of said arm by the spring the bracket 229 may be moved in a counterclockwise direction. For a purpose to be described, an arm 239 projects upwardly from and it receives a part of the bracket 229 and on its upper end arm 239 is notched to provide a shoulder 240 beyond which projects a tooth-like portion having a flat or straight across outer end 241.

Mounted on the feed screw 80 is a nut-like device 242 formed in two parts and held together by screws 243 which are preferably spring loaded whereby the parts of the device 242 are resiliently drawn against opposite sides of the feed screw 80. A projection 224 from the device 242 has a screw 245 adjustable therethrough and such projection extends over the upper side of a stop pin 246 carried by a bracket-like part 247 fastened to the near side of the saddle 201. Also, the nut-like device 242 at a place or point below the stop pin 246 is provided with a spring pressed pawl or tooth 248 normally held in the position shown by its spring but pivoted at 249 for movement in opposition to the spring.

The function of the present machine is to cut into gaskets of the desired width or thickness a cylinder or sleeve which has been placed on the mandrel 17. During a cutting operation, the feed screw 80 is intermittently operated through the Geneva gear 74 and parts driven therefrom to feed the saddle or carriage 201 outwardly along the ways 198 and 199. During each pause between operations the low portion of the cam 228 comes opposite the roller 236 and the spring 237, acting through the bracket 229 and the curved rod 224, rocks the bracket 217 in a direction to carry the cutter 22 in against the work.

Then, in the proper timed relation, the cam picks up the roller 236 and rocks the bracket 229 back pulling downwardly on the rod 224 and returning the cutter or moving the cutter back from the work against opposition of the spring 237. During each intermittent feed of the screw 80 in a counterclockwise direction, the nut device 242 being frictionally held against the screw is given a partial turn or a turn in a counterclockwise direction and the extent of this movement of the nut device is limited by engagement of the arm 244 thereof with the stop pin 246.

However, this movement does carry the pawl or dog 248 beyond the reach of the shoulder 240 of the extension or arm 239 of bracket 229 so that when said bracket is rocked by the cam, the outer end of the pawl or dog 248 does not engage on the shoulder 240. Then during the above described return movement of the bracket 229 by the cam 228, the upper end 241 of the bracket arm 239 engages the lower end of the screw 245 (the latter having been properly adjusted) and rocks the nut-like device 242 back to its original position.

However, following the last intermittent movement of the screw shaft when the nut-like device 242 has been returned to its, what may be termed, normal position on the operation of the cam to move the cutting disc 22 back from the work, the bracket 229 will be swung on the pivot 230 but the nut-like device will not have been moved since there will have been no intermittent movement of the feed screw. Therefore, the shoulder 240 of the arm 239 and the tooth-like projection of the arm beyond said shoulder will engage with the dog or pawl 248 with the flat outer end of the latter bearing against the shoulder 240. Thus bracket 229 will be locked in this rocked position against the tendency of the spring 237 and therefore the cutting disc 22 will be secured in a locked out position for return movement of the saddle 201 and parts carried thereby.

That is, during outward movement, the saddle and parts thereon are intermittently fed and the cutter disc is intermittently carried against the work cutting it into widths depending on the increments of feed employed. At the end of this movement, the saddle strikes the adjustable stop 226 and the shifter rod 64 is moved shifting the clutch 79 discontinuing the outward feed of the cutter mechanism 18. During this intermittent outward feed, the cutter disc 22 has been brought against the work at each pause in the feed. However, during return movement of the cutter mechanism or movement of such mechanism inwardly toward the housing 11, the nut-like device 242 will function as a lockout mechanism with the bracket 229 locking the cutting disc in retracted position so as to avoid chopping up the work. In connection with this operation, it is to be understood that the spring 237 is constantly biasing the cutting disc 22 towards cutting relation with work on the mandrel 17 and that the function of the cam 228 is to rock said cutting disc back from any such work.

While it is believed that the operation of the machine will be understood from the foregoing description, it is thought that a résumé of the operation may be helpful. For the purpose of the following description it will be assumed that the machine is entirely shut down and that the mandrel 17 is in collapsed condition and that the tail stock center 15 is in retracted position.

Now, the operator manipulates the handle 192 to supply fluid under pressure to the upper end of the cylinder 185 whereby the bolt 182 having been withdrawn the entire tail stock 16 is rocked back to the broken line position of Fig. 7. This exposes the outer end of the mandrel and a piece of work, a cylinder or sleeve, is slipped over the mandrel from its outer end and is properly positioned longitudinally of the mandrel. Next, by manipulation of the valve handle 192, air is caused to be supplied to the lower end of the cylinder 185 and the entire tail stock 16 is brought back to the position of Figs. 1 and 2. It is locked in this position by the bolt 182.

Then the valve handle 175 is operated to operate the valve 174 and supply air through the tube 177 to the outer end of the cylinder 169 projecting the tail stock center 15. Handle 180 is operated to lock the tail stock center in projected position. Next the various motors 19, 20 and 21 may be started but it will be understood that the various clutches are in neutral positions. However, the shaft 36 is being driven from the motor 19. Now the operator shifts the handle 53 to "expand" position shifting the clutch 59 to couple the gear 45 with the shaft 38 whereby such shaft, through gears 47 and 48, drives the tubular shaft 49.

The operator applies the brake through a pull on the handle 156 expanding the mandrel as above described. In this connection it is considered that the stop 127 has been adjusted whereby expansion of the mandrel will be stopped when the pins 126 have been forced against said stop by the mandrel sleeve 119. Proper expansion of the mandrel to properly support the work having been accomplished, lever 53 is moved to a neutral position placing the clutch 50 in such a position.

Then the operator moves the lever 53 to "start" position coupling the clutch 54 whereby there is the rather straight drive to the hollow spindle 49 and accordingly to the mandrel, all as previously described in detail. At this time the operator shifts the handle 89 to feed position coupling the clutch 79 whereby the feed screw 89 is driven intermittently through the Geneva gear 74 and the gearing previously described. Also, it will be clear that since the Geneva is being driven the gear 63 is turning and through the chain 67 and the sprockets 66 and 68, the cam shaft 69 is rotated. Therefore, as the cutter mechanism 18 is intermittently moved longitudinally of the machine, it is between such intermittent movements that the bracket 217 is rocked on the shaft 212 as an axis carrying the cutter disc 22 against the work under the influence of the spring 237 and carrying such cutter disc back from the work under the influence of the cam 228.

At the end of outward movement of the cutter mechanism 18, as determined by the setting of the outer stop 226 on the shifter rod 86, the saddle 201 comes against such stop and shifts such rod outwardly shifting the clutch. This locks gear 93 to the screw shaft and such gear, meshing with the gear 94 on the rapid traverse or return feed shaft 95 driven from the motor 20, feed screw 89 is rotated continuously and in the opposite direction and the cutter mechanism is fed back to starting position or until it engages the stop lug 227 on the shifter rod whereupon the clutch 79 is again shifted.

Then the mandrel will be collapsed by shifting the clutch 50 to clutch gear 44 to the shaft 38, all as above described. The tail stock will be operated to its lateral position and the product removed from the mandrel and a new piece of work disposed thereon. The operation of the cutting of a different or new piece of work will be that previously described.

Attention is direction to the fact that for production work the mandrel 17 is not changed and is not dismounted from the machine or from its driving relation with the machine. The product is removed from the mandrel and new work is mounted on the mandrel without, in any way, disturbing the connection of the mandrel to the driving head of the machine. The mandrel being expansible as described, it will take care of work within various limits and for larger work or smaller work, i. e., work outside of said limits, a change of mandrel is necessary.

To accomplish this, the sleeve 115 is threaded out of the nut 117 sufficient to permit the coupling nut 121 to be threaded off the shoulder 122 of the mandrel sleeve 119. Then the locking device 128 being removed from the spindle 14, the entire mandrel is withdrawn over the end of the spindle and a new mandrel of the proper capacity mounted thereon. This mandrel is coupled merely by having the notches in the inner face of its shoulder 122 receive the keys 120 on the outer end of the sleeve 115 and then tightening up the coupling nut 121 and placing the stop 128 back on the end portion of the spindle 14 and against the outer end of the externally threaded tubular part 125 integral with the hub 124 of the disc 123.

For the accommodations of different sizes of mandrels, the tail stock 16 is adjustable along the shaft or rod 162 to which the housing 160 of such tail stock is keyed as previously explained. Also, it will be understood that the inner and outer limiting devices or stops 226 and 227 are adjusted on the shifter rod 86 to positions determined by the work in hand and the length of mandrel employed.

Having thus set forth the nature of our invention, what we claim is:

1. In a machine of the class described, wherein a rotatable head carries a spindle for rotation therewith, which spindle in turn carries a work gripping means and actuating means for actuating said work gripping means into and out of work gripping relation through the longitudinal movement of said actuating means in one or the other directions relatively to said spindle, the improvement comprising power transmitting means for rotating said head and spindle including a driven shaft, a clutch operable to connect said driven shaft with said head to drive the latter and thus said spindle at an operating speed, forward reduction drive gearing between said driven shaft and said head for driving said head and spindle in forward direction at a lesser speed, reverse reduction drive gearing between said driven shaft and said head for driving said head and spindle in reverse direction at a lesser speed, and clutch means selectively operable to respectively connect said forward and reverse reduction drive gearing for driving said head and spindle in either forward or reverse directions at a lesser speed, and means manually operable for causing the rotation of said head and spindle at said lesser speed to effect longitudinal movement of said actuating means in one or the other directions depending on the selected direction of rotation of said head and spindle at said lesser speed.

2. In a machine of the class described, wherein a rotatable head carries a spindle for rotation therewith, which spindle in turn carries a work gripping means and actuating means for actuating said work gripping means into and out of work gripping relation through the longitudinal movement of said actuating means in one or the other directions relatively to said spindle, the improvement comprising a driven shaft, a clutch operable to connect said shaft with said head to drive the latter and thus said spindle at an operating speed, a second shaft parallel with said first shaft, meshing gears respectively on said second shaft and said head, a jack shaft parallel with said first and second shafts, meshing gears respectively on said jack shaft and said first shaft, a reversing shaft, meshing gears respectively on said reversing shaft and said jack shaft, a clutch selectively operable to clutch said gear on said second shaft meshing with said gear on said jack shaft to said second shaft to drive said head in one direction at a lesser speed and to clutch said gear on said second shaft meshing with said gear on said reversing shaft to said second shaft to drive said head in the opposite direction at said lesser speed, and means manually operable for causing the rotation of said head and spindle at said lesser speed to effect longitudinal actuating movement of said actuating means in one or the other directions depending on the direction of rotation of said head and spindle at said lesser speed.

3. In a machine of the class described, wherein a rotatable head carries a spindle for rotation therewith, which spindle in turn carries a work gripping means and actuating means for actuating said work gripping means into and out of work gripping relation through the longitudinal movement of said actuating means in one or the other directions relatively to said spindle, the improvement comprising a threaded sleeve keyed to said spindle for rotation with said spindle and for longitudinal movement thereon, means coupling said actuating means to said threaded sleeve for rotational and longitudinal movement therewith, a nut threaded on said threaded sleeve, a drum mounted on said head for turning movement therewith and adapted to be held stationary relative thereto, means fixing said nut to said drum for turning movement therewith, means selectively operable for driving said head and thus said spindle, drum, nut and threaded sleeve as a unit at an operating speed, and other means selectively operable for driving said parts in either forward or reverse directions at a lesser speed, brake means manually operable for applying a load to said drum whereby to hold the same stationary about said head and to hold said nut stationary when said head, spindle and threaded sleeve are being rotated at a lesser speed whereby to feed the threaded sleeve and said actuating means longitudinally in one or the other directions depending on the selected direction of rotation of said head and spindle at said lesser speed.

4. In a machine of the class described, wherein a rotatable head carries a spindle for rotation therewith, which spindle in turn carries a work gripping means and actuating means for actuating said work gripping means into and out of work gripping relation through the longitudinal movement of said actuating means in one or the other directions relatively to said spindle, the improvement comprising power transmitting means for rotating said head and spindle including a driven shaft, a clutch operable to connect said driven shaft with said head to drive the latter and thus said spindle at an operating speed, forward reduction drive gearing between said driven shaft and said head for driving said head and spindle in forward direction at a lesser speed, reverse reduction drive gearing between said driven shaft and said head for driving said head and spindle in reverse direction at a lesser speed, and clutch means selectively operable to respectively connect said forward and reverse reduction drive gearing for driving said head and spindle in either forward or reverse directions at a lesser speed, and means manually operable for causing the rotation of said head and spindle at said lesser speed to effect longitudinal movement of said actuating means in one or the other directions depending on the selected direction of rotation of said head and spindle at said lesser speed, stop means adjustable longitudinally on said spindle and disposed in the longitudinal path of movement of said actuating means in its movement to actuate said work gripping means into work gripping relation to limit said movement to a point predetermined by the position of adjustment of said stop means.

References Cited in the file of this patent

UNITED STATES PATENTS

| Number | Name | Date |
|---|---|---|
| 995,868 | Housam | June 20, 1911 |
| 1,086,606 | Merritt et al. | Feb. 10, 1914 |
| 1,448,528 | Elliott | Mar. 13, 1923 |
| 1,647,358 | Hubbard | Nov. 1, 1927 |
| 1,685,127 | Hammond | Sept. 25, 1928 |
| 1,925,498 | Plante | Sept. 5, 1933 |
| 1,944,255 | McFall | Jan. 23, 1934 |
| 2,122,204 | Gora | June 28, 1938 |
| 2,392,186 | Pierle | Jan. 1, 1946 |
| 2,493,475 | Casella | Jan. 3, 1950 |
| 2,521,003 | Gitter | Sept. 5, 1950 |